US007464113B1

(12) United States Patent
Girkar et al.

(10) Patent No.: US 7,464,113 B1
(45) Date of Patent: Dec. 9, 2008

(54) DISASTER RECOVERY WITH BOUNDED DATA LOSS

(75) Inventors: Mahesh Girkar, Nashua, NH (US); Richard J. Anderson, Nashua, NH (US); Steve Lee, Nashua, NH (US); Joydip Kundu, Nashia, NH (US)

(73) Assignee: Oracle International Corporations, Redwood Shores, CA (US)

( * ) Notice: Subject to any disclaimer, the term of this patent is extended or adjusted under 35 U.S.C. 154(b) by 1307 days.

(21) Appl. No.: 09/852,008

(22) Filed: May 10, 2001

(51) Int. Cl.
*G06F 17/30* (2006.01)
(52) U.S. Cl. .................................................. 707/200
(58) Field of Classification Search ......... 707/200–205; 711/161–162
See application file for complete search history.

(56) References Cited

U.S. PATENT DOCUMENTS

| | | | | |
|---|---|---|---|---|
| 5,640,561 A | * | 6/1997 | Satoh et al. ................. 707/202 |
| 5,668,986 A | * | 9/1997 | Nilsen et al. .................. 707/10 |
| 5,933,837 A | * | 8/1999 | Kung ......................... 707/201 |
| 5,940,827 A | * | 8/1999 | Hapner et al. .................. 707/8 |
| 6,079,000 A | * | 6/2000 | Cooper et al. ............... 711/162 |
| 6,192,377 B1 | * | 2/2001 | Ganesh et al. .............. 707/203 |
| 6,205,449 B1 | * | 3/2001 | Rastogi et al. .............. 707/202 |
| 6,243,715 B1 | * | 6/2001 | Bogantz et al. ............. 707/201 |
| 6,539,381 B1 | * | 3/2003 | Prasad et al. .................. 707/10 |

* cited by examiner

*Primary Examiner*—Debbie M Le
(74) *Attorney, Agent, or Firm*—Hanify & King, P.C.

(57) ABSTRACT

A data recovery methodology with bound transaction data loss is described in which a database operator is allowed to set a bound that limits the number of transactions that can be lost. Transactions are placed in a buffer to be sent asynchronously to the standby system and synchronized based on the predetermined bound and on the number of transactions currently in the buffer.

18 Claims, 5 Drawing Sheets

(BACKGROUND)

(BACKGROUND)

DISASTER RECOVERY WITH BOUNDED DATA LOSS

FIELD OF THE INVENTION

The present invention relates to database systems and more particularly to providing disaster recovery with a bounded data loss.

BACKGROUND OF THE INVENTION

Organizations use computer databases to store, organize, and analyze some of their most important information. For example, a business may employ a database to warehouse its sales and ordering information so that analysts can predict trends in product sales or perform other kinds of data mining for long-range planning. Because database systems are responsible for managing information vital to the organization's operation, it is crucial for mission-critical database systems to implement mechanisms for recovery following a database system failure.

Recovery from all but the most serious kinds of failures generally relies on periodic backups, which are done to save the state of the database to a longer term storage medium, such as magnetic tape or optical disk. Because users continue to modify the database since the time of the last backup, the users' committed transactions are recorded in one or more "redo logs" on disk. Thus, to recover from a system crash, the periodic backup is used to restore the database system, and the committed transactions in the redo logs are reapplied to bring the database up to date to the state at the time of the system crash.

Some failures are more serious, however. For example, a hard disk can be unreadable after a head crash. Earthquakes, fires, floods, tornadoes, and other acts of God can physically destroy the disk upon which the redo logs are saved. In these cases, the modifications and updates to the database after the last backup are permanently lost. Thus, for mission-critical database systems, a more robust approach for disaster recovery is needed. Moreover, restoration of a database from backups and redo logs is a time consuming process, and some organizations cannot afford the necessary downtime.

Accordingly, there has been much interest in implementing disaster recovery by deploying a "standby" database system that is a replica of the business's primary database system. The standby database is typically created from a backup of the primary database, and the primary database and the standby database coordinate with each other such that the standby database keeps up with changes made on the primary database. In the event of an irrecoverable crash or other disaster, the standby database can quickly be activated to become the business's new primary database without having to wait for restoring the primary database from the last backup and redo logs. To lessen the effects of disaster to the physical premises of the organization's computing equipment, it is desirable to deploy the standby database in another geographical location, such as in another city, state, country, or continent. For example, an earthquake in San Francisco is unlikely to destroy a standby database in Boston. Consequently, the primary database and the standby database typically have to communicate with one another across a network connection. Two approaches have generally been used: a "batch" approach and a "synchronous" approach.

The implementation shown in FIG. 5 illustrates the batch approach for maintaining a standby database. In this approach, a database application 500 is in primary communication with a primary system 501 but can also be in communication, when necessary, with a standby system 503, which are in different geographical locales, e.g. San Francisco and Boston, respectively. During normal operation, the database application 500 submits statements to a primary database 510 of the primary system 500. These statements cause the primary database 510 to store or retrieve data in response. When a change is committed to the primary database 510, the primary database 510 creates a redo record that describes the change and invokes a log writer process 511 to save the redo record to disk in one of a number of primary redo logs 513. Meanwhile, in the background, an archiver process 515 inspects the primary redo logs 513 and saves the redo records in primary archive logs 517. For non-disaster crash recovery, changes stored in the primary redo logs 515 and the primary archive logs 517 can be applied to a system backup of the primary database 510 to bring the database up-to-date as it existed at the time of the system crash. The archiver process 515 also transmits the redo records to the standby system 503. Specifically, a remote file server 531 receives the transmitted redo records and updates the standby archive logs 533. A managed recovery processes 535 periodically inspects the standby archive logs 535 and applies the changes to a standby database 530, which is ready to be used by the database application 500 in case of a failure in the primary database system 510. In some situations, people find it convenient to deploy the standby database 530 in read-only mode as an independent reporting database.

The batch approach, however, incurs a high risk of data loss in case of a primary system 510 crash, because the archiver process 515 works in a batch mode to ship the redo records to the standby database system 530. When the primary database system 510 crashes, the changes in the primary redo logs 513 have not yet been shipped to the standby database system 530. As a result, the standby database system 530 is unaware of these changes. These changes, accordingly, are unavailable to the database application 500 when it switches over to the standby database system 530. Moreover, it is difficult to characterize the amount of the data lost in terms that database owners can best understand. The maximum exposure for loss of data in this approach is usually described in terms of the size of the redo logs, but this information is not helpful for database owners, who would rather want to know how many orders were lost. Another way to characterize the amount of data lost is by time, for example, "within the last five minutes," but this also would not tell the database owner how may sales orders were involved.

By contrast, the synchronous approach is capable of ensuring that the standby database records every committed transaction, i.e. with zero data loss, but at a substantial performance penalty. Referring to FIG. 6, a database application 600 is in primary communication with a primary system 601 and, if necessary, also in communication with a standby system 603. During normal operation, the database application 600 submits statements to a primary database 610 of the primary system 601. These statements cause the primary database 610 to store or retrieve data in response. When a change is committed to the primary database 610, the primary database 610 creates a redo record that describes the change and invokes a log writer process 611 to save the redo record to disk in one of several primary redo logs 613. Meanwhile, a primary archiver process 615 in the background inspects the primary redo logs 613 and saves the redo records in primary archive logs 617 for use in non-disaster recovery procedures. The log writer process 611 also transmits the redo records and transaction commits to the standby database 530. Specifically, a remote file server 631 receives the transmitted redo records and transactions commits and updates the corresponding standby redo logs 633. A standby archiver process 635 also inspects the standby redo logs 633 and saves the redo records in standby archive logs 637. A managed recovery processes 639 periodically inspects the standby archive logs 637 and applies the changes to a standby database 630, which is ready to be used by the database application 600 in case of a failure in the primary database system 603.

The synchronous approach achieves zero data loss at substantial performance penalty, because the log writer process 611 does not acknowledge the commit until the remote file server 631 signals back that the transmitted transaction commit has been received, stored, and made available in the standby redo logs 633. Thus, every change acknowledged on the primary database system 610 as committed must incur a round trip network latency between the log writer 611 and the remote file server 631. This network latency is substantial and degrades performance for every transaction that the primary database 610 commits. By contrast, the performance penalty of the batch approach is less severe, which typically incurs marginal additional overhead in terms of processing and disk input/output resources.

Therefore, there is a need for a disaster recovery methodology that improves data availability over the batch approach, while providing better performance than that of the synchronous, zero data loss approach.

SUMMARY OF THE INVENTION

The present invention addresses this and other needs by allowing a database operator to set a bound that limits the number of transactions that can be lost. To improve performance over the synchronous approach, transactions are placed in a buffer to be sent to the standby system, but, to limit the data loss to a predetermined number of transactions, the transactions are synchronized based on the predetermined bound and on the number of transactions currently in the buffer. Because the predetermined bound is specified in terms of the number of transactions, the database operator can set a meaningful tradeoff between performance and data availability that is appropriate for the particular needs of the database operator's installation.

One aspect of the present invention relates to a method and software for replicating data of a primary database system. Accordingly, a buffer of transactions to be sent to a standby database system is maintained, and a transaction performed on the primary database system is synchronized based on a number of transactions in the buffer and a predetermined number of transactions. For example, a commit of the transaction is blocked until the number of transactions in the buffer is less than the predetermined number of transactions.

In one embodiment, the synchronization is enforced by the log writer process, but, in another embodiment, the synchronization is handled by user process before submitting the transaction to the log writer process. Determining the number of transactions in the buffer can be done by inspecting (or "sniffing") the buffer or by maintaining a counter that is incremented when the log writer process submits a transaction in the buffer and decremented when a net server process receives an acknowledgement that the redo for the transaction has been written to the standby logs at the standby database system.

Another aspect of the present invention pertains to a method and software for operating a log writer process to replicate data of a primary database system. In particular, the log writer process is programmed to record a transaction in a redo log and compare a counter indicating a number of the transactions in a queue of transactions to be sent to a standby database system and a predetermined bound of transactions. If the counter is greater than the predetermined bound, then the log writer process blocks a commit of the transaction until the counter is less than the predetermined bound. On the other hand, if the counter is less than the predetermined bound, then the log writer process increments the counter and acknowledges the commit of the transaction.

Still another example involves a method and software for operating a net server process to replicate data of a primary database system. Specifically, the net server process is configured to access a transaction maintained in a buffer of transactions to be sent to a standby database system, transmit the transaction over a network connection to the standby database system, receive an acknowledgment that the transaction has been committed at the standby database system; and, in response to the acknowledgment, remove the transaction from the queue and decrement the counter.

The present invention can be readily applied to a parallel database server environment in which the parallel database servers have shared disk access to the primary database. In such an environment, each database server can be given its own predetermined bound independent of the other database servers, (for example, by dividing the database operator's bound by the number of database servers), or the parallel database server can use a shared disk counter of transactions.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

A system, method, and software for disaster recovery are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

In a database management system, data is stored in one or more data containers, each container contains records, and the data within each record is organized into one or more fields. In relational database systems, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Systems that implement the present invention are not limited to any particular type of data container or database architecture. However, for the purpose of explanation, the terminology and examples used herein shall be that typically associated with relational databases. Thus, the terms "table," "row," and "column" shall be used herein to refer respectively to the data container, record, and field.

Bounding Data Loss in Terms of Transactions

Figure 1:
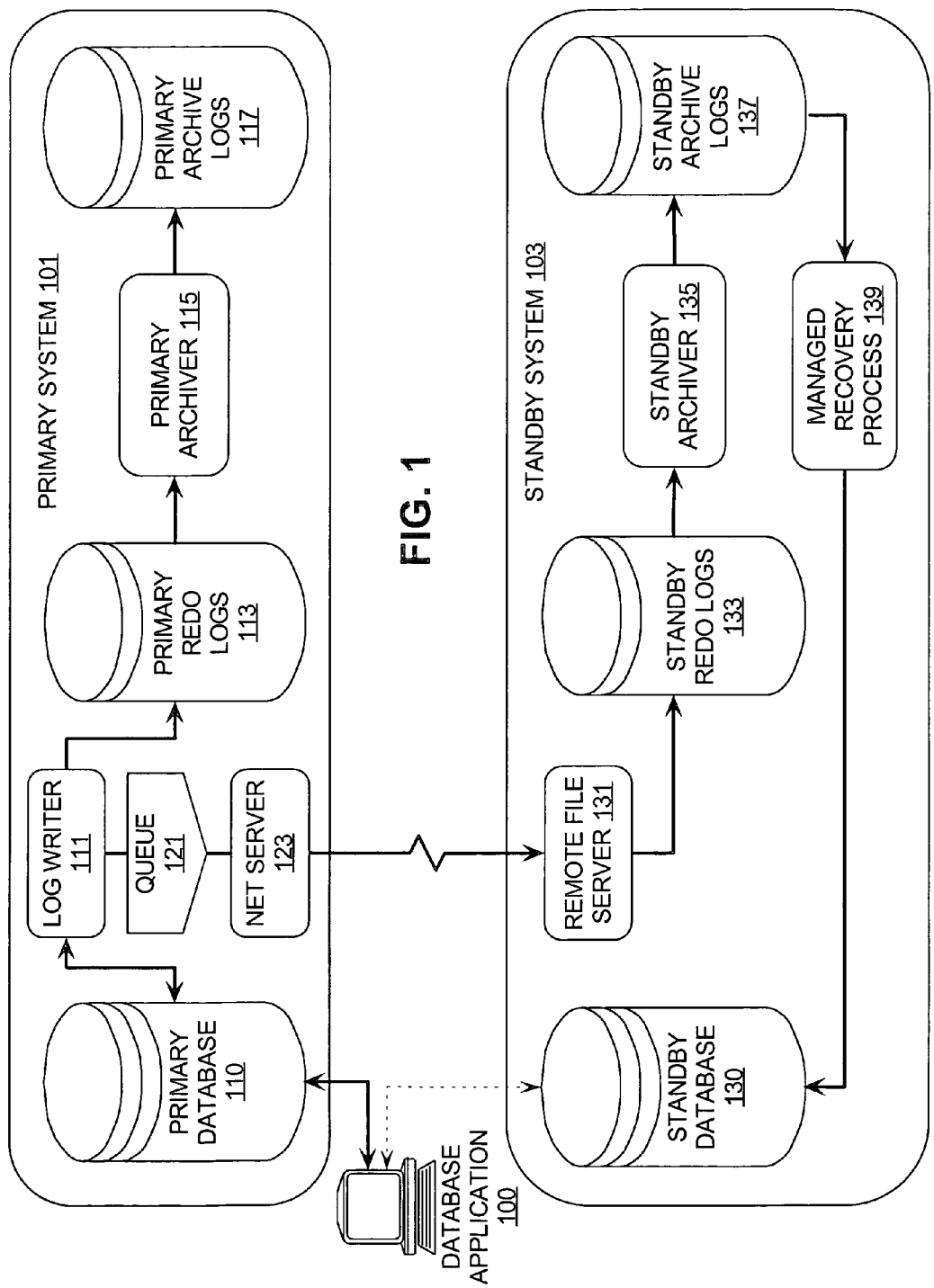
FIG. 1 depicts a disaster recovery system in accordance with one embodiment of the present invention.

In accordance with one embodiment of the present invention, exemplified in FIG. 1, a database operator is enabled to specify a bound on the number of transactions that can be lost. The exact value of the specified bound will depend on the database operator's needs and priorities for a particular installation. Setting the predetermined bound close to zero values the importance of data loss over performance, causing the primary database system 110 to behave more like the synchronous, zero-data loss approach. On the other hand, setting the predetermined bound to a large value causes the primary database system 110 to be more like the batch approach, with good performance but a higher risk of data loss. Setting the predetermined bound somewhere in between these two extremes will offset performance with reducing data loss on the standby database system 130. In fact, it is possible to dynamically change this predetermined bound in response to run-time changes in application workload, such as end-of-day processing.

In this embodiment, redo records for transactions at the primary database system 110 are placed in a queue 121, which buffers the redo records for asynchronous transmission to the standby database system 130 by a net server process 123. The net server process 123 and the log writer process 111 coordinate their work depending on the number of outstanding transactions (and related redos) in the queue 121. If the number of outstanding transactions equals the predetermined bound, then the log writer process 111 blocks before committing the redo record for the transaction to disk. Otherwise, the log writer process 111 places the redo record in the queue 121, commits the transaction to disk, and continues normal processing. The asynchronous shipping of the redo records to the standby database system 130 provides better performance over the synchronous approach, because neither the database application 100 nor the log writer process 111 has to wait for an acknowledgment from the standby database system 130 when there are fewer outstanding transactions than the predetermined bound.

More specifically, a database application 100 is in primary communication with a primary database system 110 but may also communicate (when necessary, e.g. upon failover) with a standby database system 130. During normal operation, the database application 100 submits statements to the primary database system 110 for storing or retrieving data to or from, respectively, the primary database 110. When a request to commit a change is submitted to the primary database 110 (FIG. 2, step 201), the primary database 110 creates a redo record that describes the change and invokes a log writer process 111. In response, the log writer process 111 synchronizes the transaction based on the number of outstanding transactions and the predetermined threshold value set by the database operator.

In one implementation, a shared memory counter, guarded by a concurrency latching mechanism such as a semaphore, is used to keep track of the number of outstanding transaction commits in the queue 121. In particular, the log writer process 111 checks the shared memory counter to determine if the number of outstanding transactions is not equal to the predetermined the log writer 111 to batch up the submissions to the queue 121 in terms of disk blocks, which is more efficient in terms of disk access than individually updating the queue 121 for each transaction.

In one implementation, only the transaction commit needs to be enqueued in the queue 121. According to transactional semantics and presumed rollback, no transaction changes are visible until the transaction is committed to the. These semantics allow the transaction data to be sent immediately to the standby system 130 even if the predetermined bound of the queue 121 is exceeded. In that case, the transaction data, although previously saved in the standby redo logs 133, will not be visible on the standby system 130 until the queued and transmitted transaction commit is recorded in the standby redo logs 133.

The present invention can be implemented in a configuration involving multiple standby systems. In this case, there can be different bounds for each of the standby systems, respectively. Alternatively, a common bound can be used such that all of the multiple standby systems have to acknowledge the shipping of the redo log record. In another embodiment, an acknowledgment from at least one of the multiple standby systems would be sufficient to consider the redo record committed.

The present invention can also be implemented on a multiprocessor, shared disk system, in which multiple database servers operate in parallel independently but use a common database on a shared disk. Although the multiple database servers can coordinate their submissions to the queue 121 via a counter stored on disk, it preferable for performance reasons to set an individual bound of $\lfloor K/N+1 \rfloor$, where $\lfloor \ \rfloor$ is the lower bound operator, K is the database operator's bound, and N is the number of parallel database servers. In addition, K should be restricted to be greater than N, which is usually not a significant constraint since N is typically very small (e.g. les than four). Each database server then operates as described above but independently of one another with its own individual bound.

Hardware Overview

Figure 4:
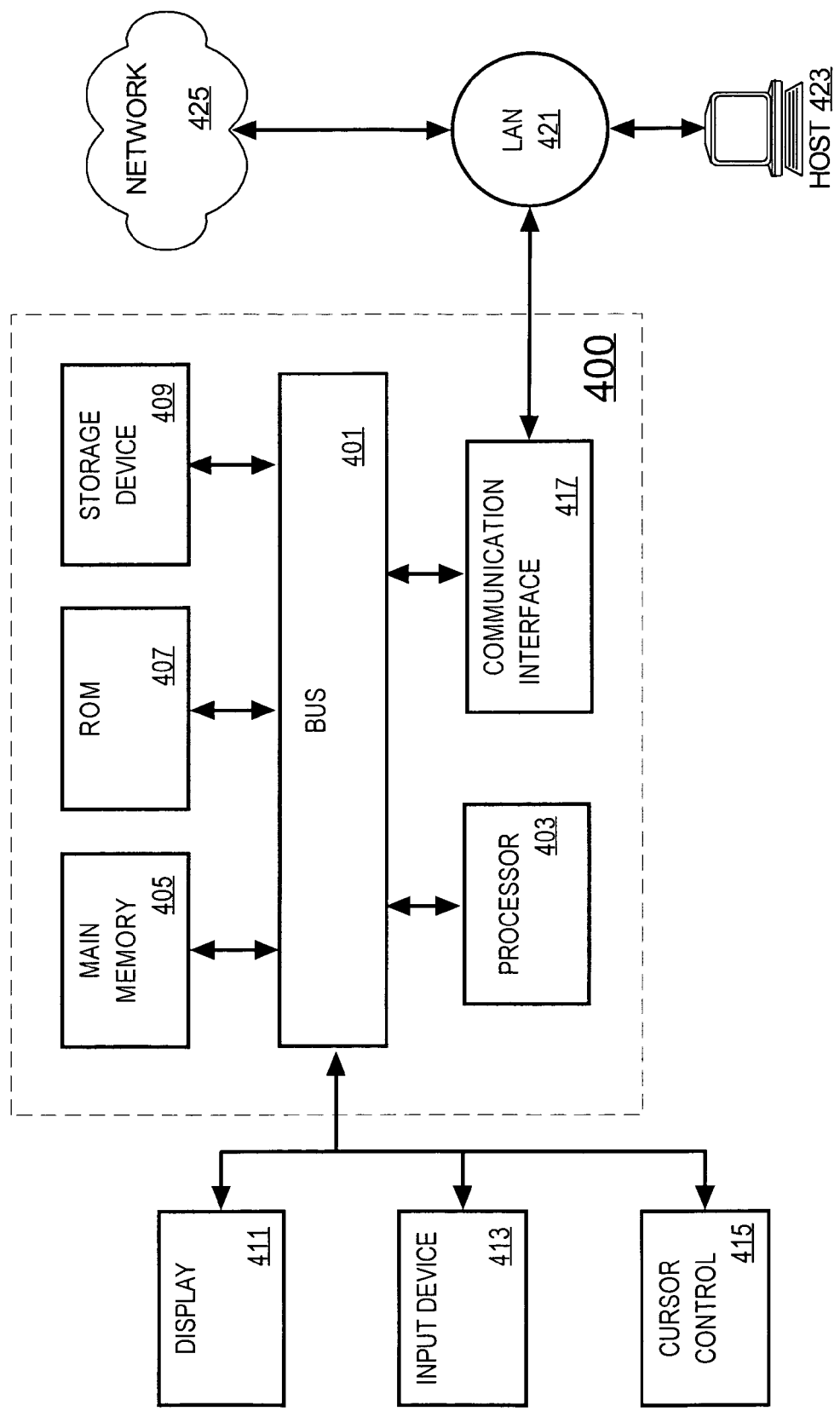
FIG. 4 depicts a computer system that can be used to implement an embodiment of the present invention.
Figure 5:
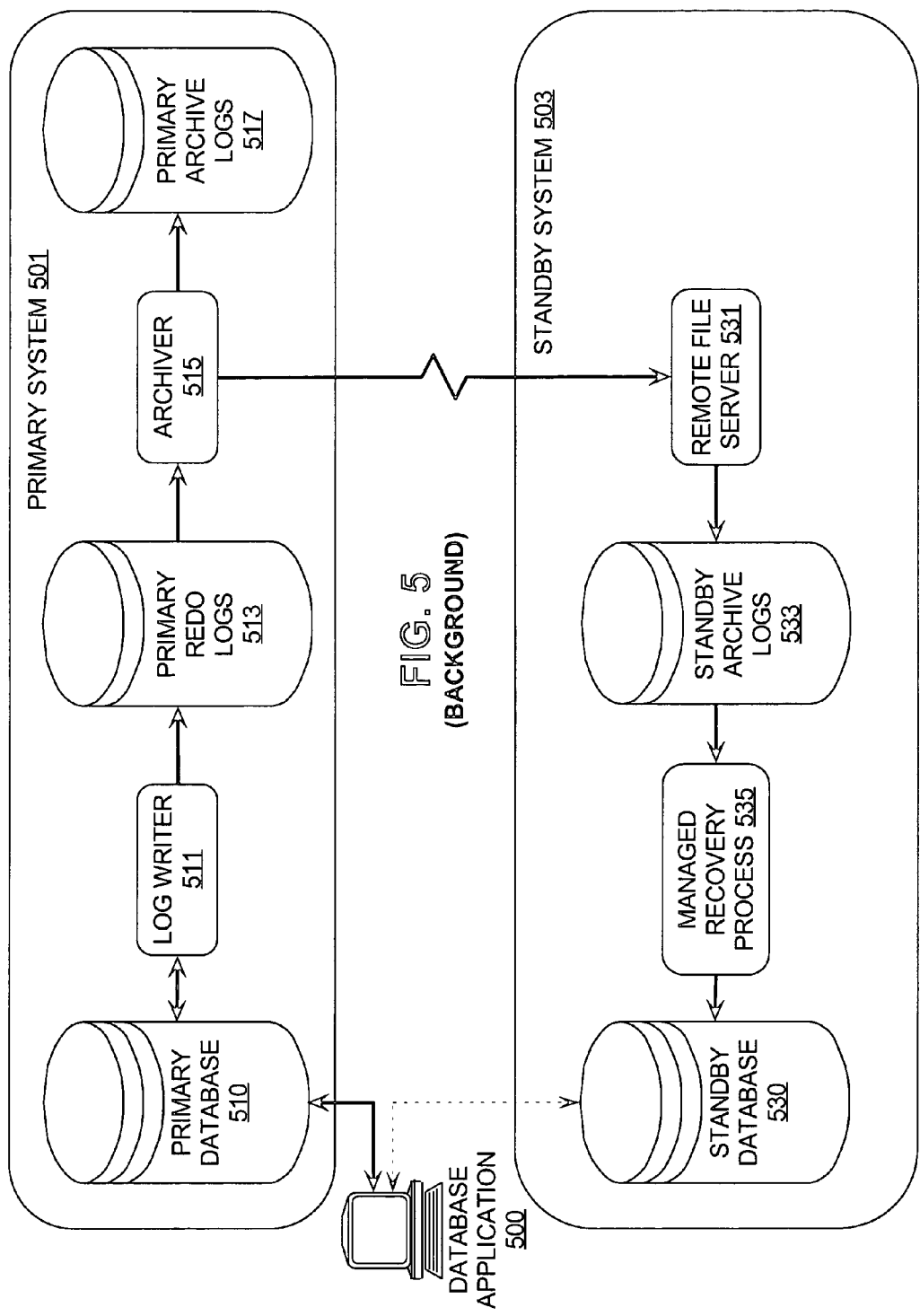
FIG. 5 depicts a batch approach to disaster recovery using log shipping.
Figure 6:
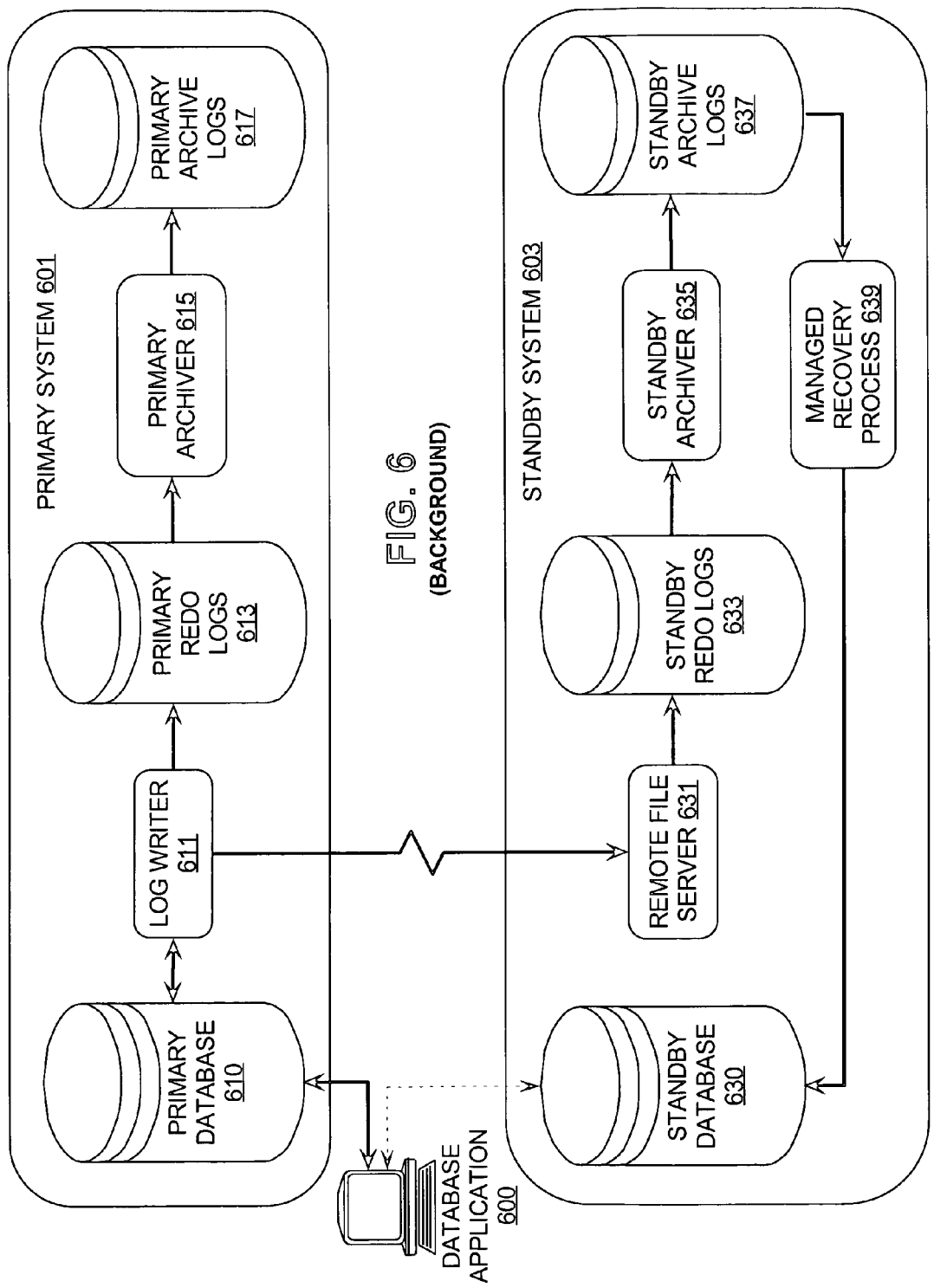
FIG. 6 depicts a synchronous approach to disaster recovery using log shipping.

FIG. 4 illustrates a computer system 400 upon which an embodiment according to the present invention can be implemented. The computer system 400 includes a bus 401 or other communication mechanism for communicating information, and a processor 403 coupled to the bus 401 for processing information. The computer system 400 also includes main memory 405, such as a random access memory (RAM) or other dynamic storage device, coupled to the bus 401 for storing information and instructions to be executed by the processor 403. Main memory 405 can also be used for storing temporary variables or other intermediate information during execution of instructions to be executed by the processor 403.

The computer system 400 further includes a read only memory (ROM) 407 or other static storage device coupled to the bus 401 for storing static information and instructions for the processor 403. A storage device 409, such as a magnetic disk or optical disk, is additionally coupled to the bus 401 for storing information and instructions.

The computer system 400 may be coupled via the bus 401 to a display 411, such as a cathode ray tube (CRT), liquid crystal display, active matrix display, or plasma display, for displaying information to a computer user. An input device 413, such as a keyboard including alphanumeric and other keys, is coupled to the bus 401 for communicating information and command selections to the processor 403. Another type of user input device is cursor control 415, such as a mouse, a trackball, or cursor direction keys for communicating direction information and command selections to the processor 403 and for controlling cursor movement on the display 411.

According to one embodiment of the invention, disaster recovery is provided by the computer system 400 in response to the processor 403 executing an arrangement of instructions contained in main memory 405. Such instructions can be read into main memory 405 from another computer-readable medium, such as the storage device 409. Execution of the arrangement of instructions contained in main memory 405 causes the processor 403 to perform the process steps described herein. One or more processors in a multi-processing arrangement may also be employed to execute the instructions contained in main memory 405. In alternative embodiments, hard-wired circuitry may be used in place of or in combination with software instructions to implement the embodiment of the present invention. Thus, embodiments of the present invention are not limited to any specific combination of hardware circuitry and software.

The computer system 400 also includes a communication interface 417 coupled to bus 401. The communication interface 417 provides a two-way data communication coupling to a network link 419 connected to a local network 421. For example, the communication interface 417 may be a digital subscriber line (DSL) card or modem, an integrated services digital network (ISDN) card, a cable modem, or a telephone modem to provide a data communication connection to a corresponding type of telephone line. As another example, communication interface 417 may be a local area network (LAN) card (e.g. for Ethernet™ or an Asynchronous Transfer Model (ATM) network) to provide a data communication connection to a compatible LAN. Wireless links can also be implemented. In any such implementation, communication interface 417 sends and receives electrical, electromagnetic, or optical signals that carry digital data streams representing various types of information. Further, the communication interface 417 can include peripheral interface devices, such as a Universal Serial Bus (USB) interface, a PCMCIA (Personal Computer Memory Card International Association) interface, etc.

The network link 419 typically provides data communication through one or more networks to other data devices. For example, the network link 419 may provide a connection through local network 421 to a host computer 423, which has connectivity to a network 425 (e.g. a wide area network (WAN) or the global packet data communication network now commonly referred to as the "Internet") or to data equipment operated by service provider. The local network 421 and network 425 both use electrical, electromagnetic, or optical signals to convey information and instructions. The signals through the various networks and the signals on network link 419 and through communication interface 417, which communicate digital data with computer system 400, are exemplary forms of carrier waves bearing the information and instructions.

The computer system 400 can send messages and receive data, including program code, through the network(s), network link 419, and communication interface 417. In the Internet example, a server (not shown) might transmit requested code belonging an application program for implementing an embodiment of the present invention through the network 425, local network 421 and communication interface 417. The processor 404 may execute the transmitted code while being received and/or store the code in storage device 49, or other non-volatile storage for later execution. In this manner, computer system 400 may obtain application code in the form of a carrier wave.

The term "computer-readable medium" as used herein refers to any medium that participates in providing instructions to the processor 404 for execution. Such a medium may take many forms, including but not limited to non-volatile media, volatile media, and transmission media. Non-volatile media include, for example, optical or magnetic disks, such as storage device 409. Volatile media include dynamic memory, such as main memory 405. Transmission media include coaxial cables, copper wire and fiber optics, including the wires that comprise bus 401. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistance (PDA) and a laptop. An infrared detector on the portable computing device receives the information and instructions borne by the infrared signal and places the data on a bus. The bus conveys the data to main memory, from which a processor retrieves and executes the instructions. The instructions received by main memory may optionally be stored on storage device either before or after execution by processor.

While the present invention has been described in connection with a number of embodiments and implementations, the present invention is not so limited but covers various obvious modifications and equivalent arrangements, which fall within the purview of the appended claims.

What is claimed is:

1. A method for replicating data of a primary database system, comprising the steps of:
    maintaining a queue of information associated with transactions to be sent to a standby database system;
    storing a counter indicating a number of the transactions having information in the queue;
    storing a predetermined bound of transactions having information in the queue;
    executing a log writer process to:
        record a transaction in a redo log,
        compare the counter and the predetermined bound, if the counter is not less than the predetermined bound, then block a commit of the transaction until the counter is less than the predetermined bound, and if the counter is less than the predetermined bound, then increment the counter and acknowledge the commit of the transaction; and executing a net server process to:

transmit the information associated with a transaction over a network connection to the standby database system, receive an acknowledgement that a redo record based on the information associated with the transaction has been written to a standby log at the standby database system, and in response to the acknowledgement, remove the information associated with the transaction from the queue and decrement the counter.

2. A method according to claim 1, wherein the step of synchronizing includes the step of:

blocking a commit of the transaction until the number of transactions in the buffers is in a predetermined numerical relationship with the predetermined number of transactions.

3. A method according to claim 2, wherein:

said blocking the commit of the transaction until the number of transactions in the buffers is in the predetermined numerical relationship with the predetermined number of transactions including blocking the commit of the transaction until the number of transactions in the buffers is less than the predetermined number of transactions.

4. A method according to claim 1, wherein:

the log writer process performs the step of synchronizing.

5. A method according to claim 1, wherein:

a database application process performs the step of synchronizing before submitting the transaction to the log writer process.

6. A method according to claim 1, further comprising the steps of:

receiving input from an operator indicating a transaction loss bound; and setting the predetermined number of transactions based on the transaction loss bound.

7. A computer-readable medium bearing instructions for causing one or more processors to perform the steps of the method according to claim 1.

8. A method for replicating data in a primary database system having multiple database servers operating in parallel and accessing a common database on a shared disk, said method comprising the steps of:

setting a bound for each of the multiple database servers;

for each of the multiple database servers, performing the steps of:

maintaining a buffer of transactions to be sent to a standby database system; and synchronizing a transaction performed on the primary database system based on a number of transactions in the buffer and the corresponding bound;

storing a counter indicating a number of the transactions in the queue;

storing a predetermined bound of transactions, executing a log writer process to:

record the transaction in a redo log, compare the counter and the predetermined bound, if the counter is not less than the predetermined bound, then block a commit of the transaction until the counter is less than the predetermined bound, and if the counter is less than the predetermined bound, then increment the counter and acknowledge the commit of the transaction; and executing a net server process to:

transmit the transaction over a network connection to the standby database system, receive an acknowledgement that a redo record for the transaction has been written to a standby log at the standby database system, and in response to the acknowledgement, remove the transaction from the queue and decrement the counter.

9. The method according to claim 8, wherein the step of synchronizing includes the step of blocking a commit of the transaction until the number of transactions in the buffers is in a predetermined numerical relationship with the predetermined number of transactions.

10. The method according to claim 8, wherein said blocking the commit the transaction until the number of transactions in the buffer is in the predetermined numerical relationship with the predetermined number of transaction including blocking the commit of the transaction until the number of transactions in the buffer is less than the predetermined number of transactions.

11. The method according to claim 8, wherein the log writer process performs the step of synchronizing.

12. The method according to claim 8, wherein a database application process performs the step of synchronizing before submitting the transaction to the log writer process.

13. The method according to claim 8, further comprising the steps of:

receiving input from an operator indicating a transaction loss bound, and setting the predetermined number of transactions based on the transaction loss bound.

14. A computer-readable medium bearing instructions for causing one or more processors to perform the steps of the method according to claim 8.

15. A method for replicating data of a first database system, comprising the steps of:

allowing transactions on the first database system to commit while a number of committed transactions on the first database system for which an acknowledgement that information relating to each transaction of the committed transactions has been stored at a second database system has not been received is less than a predetermined bound; and blocking transactions on the first database system from committing while the number of committed transactions on the first database system for which an acknowledgement that information relating to each transaction of the committed transactions has been stored at the second database system has not been received is not less than the predetermined bound.

16. The method of claim 15, wherein the information relating to each transaction includes redo information relating to the transaction.

17. The method of claim 16, wherein the information relating to each transaction is stored at the second database system by writing the redo information to a redo log.

18. The method of claim 15, further comprising:

sending information relating to each transaction of the committed transactions to second database system to be stored; and receiving an acknowledgement that information relating to at least some of the committed transactions has been stored at the second database system.

* * * * *

UNITED STATES PATENT AND TRADEMARK OFFICE
CERTIFICATE OF CORRECTION

PATENT NO. : 7,464,113 B1  Page 1 of 2
APPLICATION NO. : 09/852008
DATED : December 9, 2008
INVENTOR(S) : Girkar et al.

It is certified that error appears in the above-identified patent and that said Letters Patent is hereby corrected as shown below:

On the Title Page, Item (73) in "Assignee", line 1, delete "Corporations" and insert -- Corporation --, therefor.

In column 2, line 45, after "how" delete "may" and insert -- many --, therefor.

Figure 2:
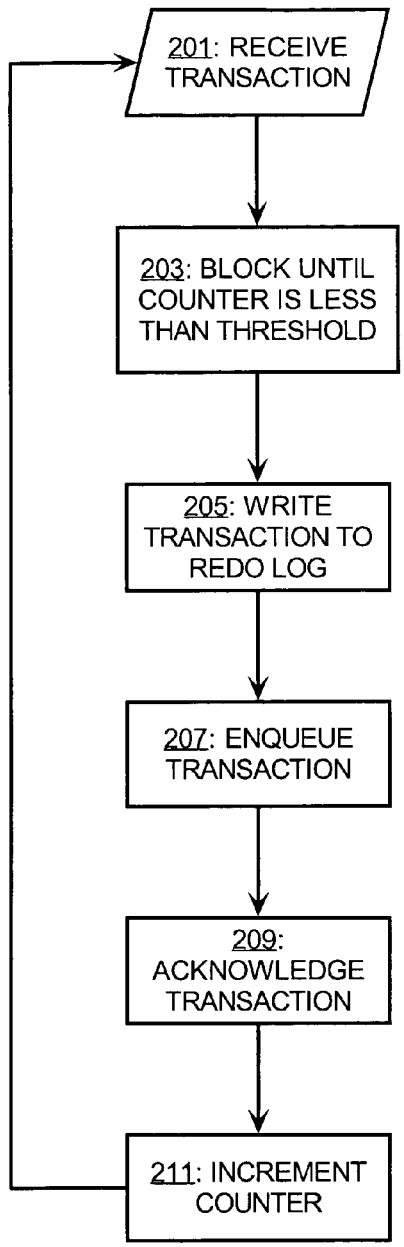
FIG. 2 illustrates the operation of synchronizing a transaction in accordance with one embodiment of the present invention.

In column 6, lines 14-15, delete "In one implementation, a shared memory counter, guarded by a concurrency latching mechanism such as a semaphore, is used to keep track of the number of outstanding transaction commits in the queue 121. In particular, the log writer process 111 checks the shared memory counter to determine if the number of outstanding transactions is not equal to the predetermined the log writer 111 to batch up the submissions to the queue 121 in terms of disk blocks, which is more efficient in terms of disk access than individually updating the queue 121 for each transaction." and insert -- In one implementation, a shared memory counter, guarded by a concurrency latching mechanism such as a semaphore, is used to keep track of the number of outstanding transaction commits in the queue 121. In particular, the log writer process 111 checks the shared memory counter to determine if the number of outstanding transactions is not equal to the predetermined threshold of transactions set by the database operator (FIG. 2, step 203). If the number of outstanding transaction commits does indeed equal the predetermined threshold of transactions, then the log writer process 111 blocks until the counter is reduced below the predetermined threshold. (As described below, this operation is performed by the net server process 123 at steps 309 and 311 of FIG. 3). On the other hand, when the number of outstanding transaction commits does not exceed the predetermined threshold of transactions, the log writer process 111 writes the transaction to one of the primary redo logs 113 (FIG. 2, step 205), submits the redo record corresponding to the transaction in the queue 121 (FIG. 2, step 207), acknowledges the commit to the primary database 110 (FIG. 2, step 209), and increments the shared memory counter (FIG. 2, step 211).

Figure 3:
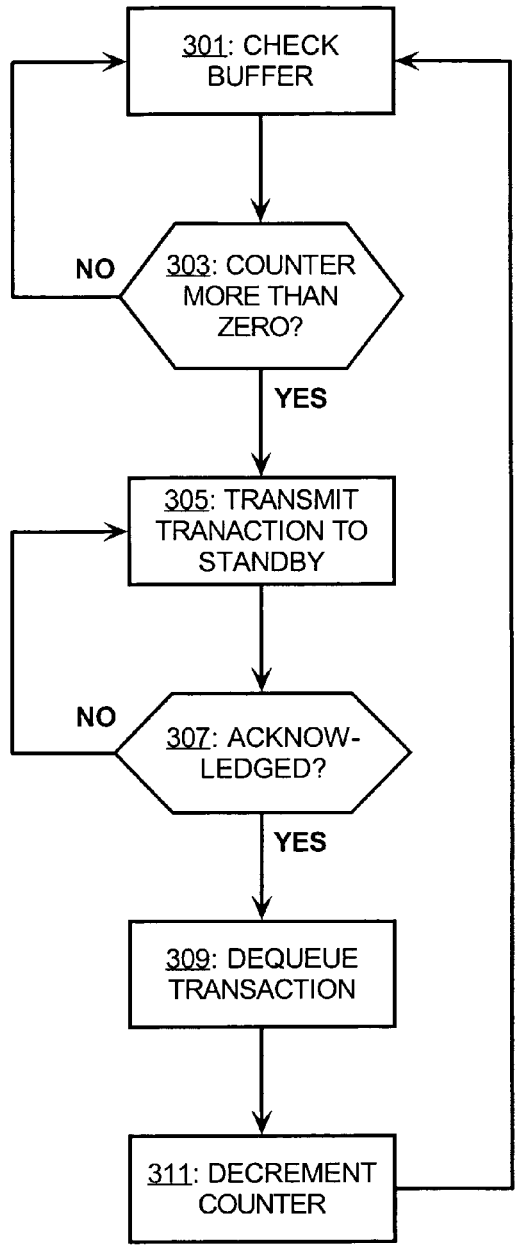
FIG. 3 illustrates the operation of shipping a redo log record in accordance with one embodiment of the present invention.

Concurrently, the net server process 123 is checking the queue 123 (FIG. 3, step 301) for redo records that have been submitted by the log writer process 111 (in FIG. 2, step 207). In one embodiment the net server process 123 checks the shared memory counter to determine if the counter is greater than zero (FIG. 3, 303). If the counter is not greater than zero, there are no redo records to be shipped to the standby system 103, so the net server process 123 loops back to step 301 of FIG. 3 where the buffer or counter is checked again. On the other hand, if the counter is greater than zero, then there are redo Signed and Sealed this Twenty-ninth Day of June, 2010

David J. Kappos
*Director of the United States Patent and Trademark Office* records to ship to the standby database system 130. Accordingly, the net server process 123 transmits the redo record to a remote file server 131 on the standby database system 130. In response, the remote file server 131 saves the transmitted redo record in one of the standby redo logs 133 and sends an acknowledgment back to the net server process 123 that the redo record for the transaction has been written to the standby redo logs 133.

If the net server process 123 does not receive the acknowledgment (tested at step 307 of FIG. 3), then something went wrong and, accordingly, the net server process 123 takes an appropriate action, such as returning to 305 of FIG. 3 and retransmitting the redo record. On the other hand, if the net server process 123 had indeed received the acknowledgment, then the redo record is dequeued from the buffer 121 (FIG. 3, 309) and the shared memory counter is decremented (FIG. 3, 311).

Meanwhile, a primary archiver process 115 inspects the primary redo logs 113 in the background and saves the redo records in primary archive logs 117 for use in non-disaster recovery procedures. Likewise on the standby database system 130 side, a standby archiver process 135 inspects the standby redo logs 133 and saves the redo records in standby archive logs 137 and sends an acknowledgment back to the net server process 123 that the redo record for the transaction has been written to the standby redo logs 133. A managed recovery processes 139 periodically inspects the standby archive logs 137 and applies the changes to a standby database 130, which is ready to be used by the database application 100 in case of a failure in the primary database system 110.

Accordingly, an embodiment of the present invention is described in which database operators are permitted to specify how many transactions worth of data they are willing to lose in the worst case. Once the predetermined bound has been set by the database operator, no matter what happens at the primary database system 110, the standby database system 130 can lose no more than the data in the predetermined number of transactions. This guarantee, which characterizes the possible loss of data in terms of the number of transactions, is much more meaningful for database operators than a loss limitation in terms of bytes of storage or minutes of time. For example, database programmers can set a particular bound on the number of transactions that can be lost and code their database applications 100 to be intelligent about that bound when connected to the standby database system 130 in the event of a mishap on the primary database system 110. The database applications 100 can keep track of the data committed in the last number of transactions and verify which of these made it to the standby database system 130 and which did not.

ALTERNATIVE EMBODIMENTS

The present invention is not limited to the embodiment disclosed and described with respect to FIGS. 1, 2, and 3, but can be implemented in various other ways. For example, enforcement of the synchronization of a transaction commits can be performed by the primary database 110 or database application 100 before submitting a commit for the transaction to the log writer process 111, simply by checking the shared memory counter. This embodiment allows the log writer 111 to batch up the submissions to the queue 121 in terms of disk blocks, which is more efficient in terms of disk access than individually updating the queue 121 for each transaction. --, therefor.

In column 9, line 58, in claim 8, after "transactions" delete "," and insert -- ; --, therefor.

In column 10, line 30, in claim 13, after "bound" delete "," and insert -- ; --, therefor.